US012080236B2

(12) United States Patent
Zhou et al.

(10) Patent No.: US 12,080,236 B2
(45) Date of Patent: Sep. 3, 2024

(54) DRIVING CIRCUIT AND DRIVING METHOD AND DISPLAY DEVICE

(71) Applicant: HKC CORPORATION LIMITED, Shenzhen (CN)

(72) Inventors: Renjie Zhou, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 22 days.

(21) Appl. No.: 18/091,937

(22) Filed: Dec. 30, 2022

(65) Prior Publication Data

US 2023/0215367 A1 Jul. 6, 2023

(30) Foreign Application Priority Data

Dec. 30, 2021 (CN) ......................... 202111681260.6

(51) Int. Cl.
*G09G 3/3233* (2016.01)
*G09G 3/36* (2006.01)

(52) U.S. Cl.
CPC ......... *G09G 3/3233* (2013.01); *G09G 3/3648* (2013.01); *G09G 2300/0819* (2013.01); *G09G 2300/0842* (2013.01); *G09G 2310/0286* (2013.01); *G09G 2320/0257* (2013.01)

(58) Field of Classification Search
CPC ......... G09G 3/32-3291; G09G 3/3648; G09G 2300/0819; G09G 2300/0842; G09G 2310/0286; G09G 2320/0257
See application file for complete search history.

(56) References Cited

U.S. PATENT DOCUMENTS

| | | | | |
|---|---|---|---|---|
| 11,138,925 | B1 | 10/2021 | Wang et al. | |
| 11,138,947 | B2 * | 10/2021 | Iwase | G09G 3/3266 |
| 2007/0285376 | A1 * | 12/2007 | Hung | G09G 3/3688 345/100 |
| 2014/0062331 | A1 | 3/2014 | Nam et al. | |
| 2017/0256198 | A1 | 9/2017 | Hwang et al. | |

(Continued)

FOREIGN PATENT DOCUMENTS

| | | | |
|---|---|---|---|
| CN | 101123071 | A | 2/2008 |
| CN | 101540148 | A | 9/2009 |

(Continued)

OTHER PUBLICATIONS

U.S. Appl. No. 18/091,858, filed Dec. 30, 2022.
U.S. Appl. No. 18/092,180, filed Dec. 30, 2022.

*Primary Examiner* — Gene W Lee
(74) *Attorney, Agent, or Firm* — Franklin & Associates International Inc; Matthew F. Lambrinos

(57) ABSTRACT

Disclosed are a driving circuit, a driving method and a display device. The driving circuit (100) comprises: a data writing circuit (101), configured to, under control of a first scanning signal received at the first scanning signal end, write a data signal received at the data signal end into the first node; a control circuit (102), configured to, under control of a third scanning signal received at the third scanning signal end (SCAN3), write a data signal received by the first node (N1) into the second node (N2); and a driving sub-circuit (103), configured to, under control of a data signal received at the second node (N2), use a driving voltage received at the driving voltage end (Vdd) to drive the light-emitting component 104.

16 Claims, 7 Drawing Sheets

(56) References Cited

U.S. PATENT DOCUMENTS

| | | | | |
|---|---|---|---|---|
| 2018/0182296 | A1* | 6/2018 | Wang | G09G 3/3233 |
| 2020/0184892 | A1 | 6/2020 | Yang et al. | |
| 2020/0394968 | A1* | 12/2020 | Kwon | G09G 3/3291 |
| 2021/0375203 | A1* | 12/2021 | Chen | G09G 3/2074 |

FOREIGN PATENT DOCUMENTS

| | | | |
|---|---|---|---|
| CN | 103137067 | A | 6/2013 |
| CN | 103576400 | A | 2/2014 |
| CN | 103680393 | A | 3/2014 |
| CN | 105243996 | A | 1/2016 |
| CN | 105489167 | A | 4/2016 |
| CN | 106328058 | A | 1/2017 |
| CN | 106340268 | A | 1/2017 |
| CN | 106935201 | A | 7/2017 |
| CN | 107170407 | A | 9/2017 |
| CN | 108335671 | A | 7/2018 |
| CN | 109147665 | A | 1/2019 |
| CN | 109523956 | A | 3/2019 |
| CN | 110136650 | A | 8/2019 |
| CN | 110197842 | A | 9/2019 |
| CN | 110599959 | A | 12/2019 |
| CN | 110660360 | A | 1/2020 |
| CN | 111415620 | A | 7/2020 |
| CN | 111445858 | A | 7/2020 |
| CN | 111462694 | A | 7/2020 |
| CN | 111627375 | A | 9/2020 |
| CN | 111710298 | A | 9/2020 |
| CN | 112562593 | A | 3/2021 |
| CN | 113066434 | A | 7/2021 |
| CN | 113707090 | A | 11/2021 |
| CN | 113937157 | A | 1/2022 |
| CN | 114038430 | A | 2/2022 |

* cited by examiner

DRIVING CIRCUIT AND DRIVING METHOD AND DISPLAY DEVICE

CROSS-REFERENCE TO RELATED APPLICATIONS

This present application claims priority under 35 U.S.C. § 119 to Chinese patent application No. 202111681260.6, filed on Dec. 30, 2021 before the China National Intellectual Property Administration of the People's Republic of China, the contents of which is explicitly incorporated herein by reference in its entirety.

FIELD

The present disclosure relates to the field of liquid crystal display technology, and in particular, to a driving circuit and a driving method and a display device.

BACKGROUND

The OLED (Organic Light-Emitting Diode) liquid crystal display panel belongs to a current-type organic light-emitting component, which emits light through the injection and recombination of carriers, and the luminous intensity is proportional to the injected current. Compared with liquid crystal display technology known by the inventor, AMOLED (Active-matrix organic light-emitting diode) is a self-luminous display technology, when a single pixel displays black, it will not work. Therefore, the contrast ratio of AMOLED is higher than that of liquid crystal displays with backlight.

SUMMARY

In an aspect, a driving circuit is provided by the embodiment of the present disclosure, the driving circuit comprises:

- a data writing circuit, coupled to a first scanning signal end, a data signal end and a first node, and configured to, under a control of a first scanning signal received at the first scanning signal end, write a data signal received at the data signal end into the first node;
- a control circuit, coupled to the first node, a second node and a third scanning signal end, and configured to, under control of a third scanning signal received at the third scanning signal end, write a data signal received by the first node into the second node;
- a driving sub-circuit, coupled to the second node, a driving voltage end and a light-emitting component, and configured to, under control of a data signal received at the second node, use a driving voltage received at the driving voltage end to drive the light-emitting component.

In other aspect, a driving method of a driving circuit is provided by the embodiment of the present disclosure, comprising:

- writing the data signal received at the data signal end into the first node under control of the first scanning signal received at the first scanning signal end by the data writing circuit;
- writing the data signal received at the first node into the second node under the control of the third scanning signal received at the third scanning signal end by a control circuit;
- using the driving voltage received at the driving voltage end to drive the light-emitting component under control of the data signal received at the second node by the driving sub-circuit.

In further aspect, a display device is provided by the embodiment of the present disclosure, comprising:

- a plurality of driving circuits provided by the embodiment of the present disclosure;
- a plurality of light-emitting components, wherein one of the driving circuit is coupled to at least one of the light-emitting components.

In the driving circuit and driving method and display device provided by the embodiments of the present disclosure, the driving circuit comprises: data writing circuit, control circuit, driving sub-circuit. a data writing circuit, coupled to a first scanning signal end, a data signal end and a first node; the data writing circuit is configured to, under a control of the first scanning signal received at the first scanning signal end, write the data signal received at the data signal end into the first node; a control circuit, coupled to a first node, a second node and a third scanning signal end; the control circuit is configured to, under a control of the third scanning signal received at the third scanning signal end, write the data signal received by the first node into the second node; a driving sub-circuit, coupled to the second node, a driving voltage end and a light-emitting component; and the driving sub-circuit is configured to, under the control of a data signal received at the second node, use the driving voltage received at the driving voltage end to drive the light-emitting component to work. A solution provided by the present disclosure, makes the light-emitting component do not emit light by controlling the scanning signals of the first scanning signal end and the third scanning signal end before the liquid crystal display panel switches the screen, thereby improving the smear problem.

Connection structure of light-emitting component of embodiments provided in the present disclosure makes the working control of the light-emitting component controlled by data signal received by the second node. The data signals of second node are controlled by first scan signal and third scan signal respectively. Light-emitting component will be controlled to emit light when the first scan signal and the third scan signal exist simultaneously, Light-emitting component will be controlled not to emit light when first scan signal and third scan signal not exist at the same time. In a specific disclosure, light-emitting components is controlled not to emit light during a process of switching LCD panel because the first scan signal and the third scan signal will be appeared before switching, light-emitting component will emit light after switching because the first scan signal end and the third scan signal end exist at the same time, and then during a process of switching, light-emitting component, the LCD display panel will be displayed as black because the light-emitting component not emit light, and then will be displayed as other colors after switching, which can improve the shadow problem caused by the light emitting device still emit light during a process of switching.

DETAILED DESCRIPTION

In order to more clearly illustrate the technical solutions in the embodiments or exemplary technologies of the present disclosure, the specific embodiments of the present disclosure will be described below with reference to the accompanying drawings. Obviously, the drawings in the following description are only some embodiments of the present disclosure. For those of ordinary skill in the art, other drawings can also be obtained from these drawings without creative efforts, and obtain other implementations.

For the sake of simplicity of the drawings, only the parts relevant to the present disclosure are schematically shown in each drawing, and they do not represent the actual structure as a product. In addition, in order to make the drawings concise and easy to understand, only one of the components having the same structure or function in some drawings is schematically drawn, or only one of them is marked. In this document, “one” not only means “only one”, but can also mean “a plurality of one”.

The present disclosure will be described in further detail below with reference to the accompanying drawings and embodiments.

First Embodiment

Figure 1:
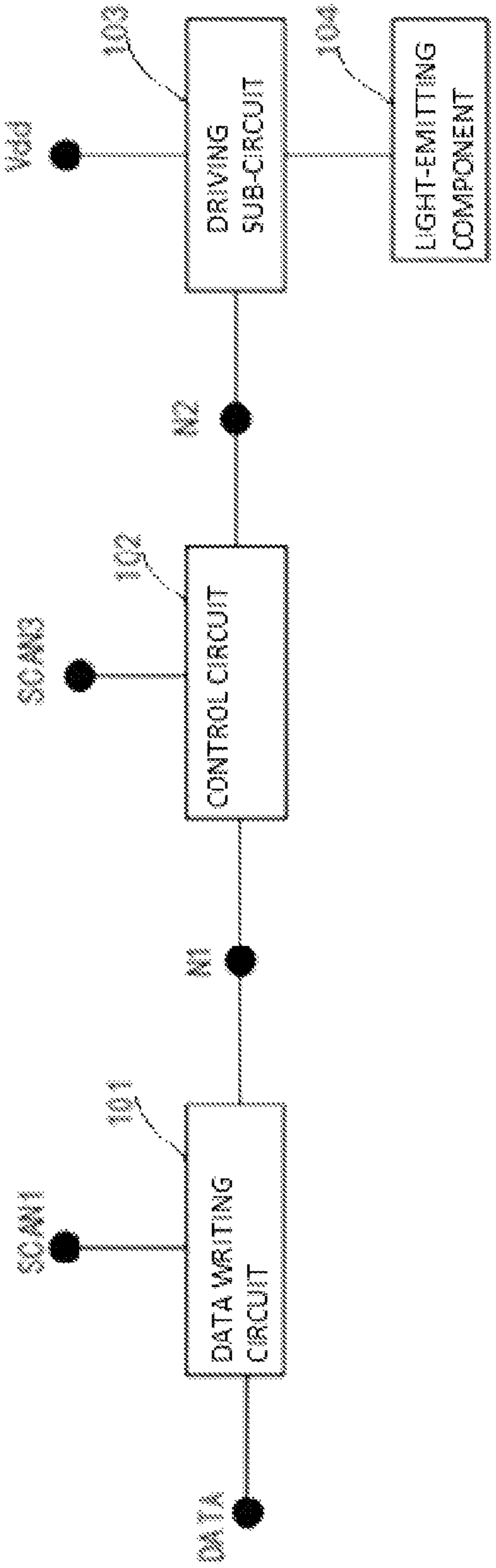
FIG. 1 is a schematic structural diagram of a driving circuit according to an embodiment of the present disclosure.

As shown in FIG. 1, a driving circuit is provided by an embodiment of the present disclosure, and the driving circuit 100 comprises a data writing circuit 101, a control circuit 102, a driving sub-circuit 103, wherein,

- data writing circuit 101 is coupled to a first scanning signal end SCAN1, a data signal end DATA and a first node N1 respectively, and working way of data writing circuit 101 is: under control of the first scanning signal received at a first scanning signal end SCAN1, a data signal received at the data signal end DATA is written into the first node N1 by data writing circuit 101;
- control circuit 102 is coupled to the first node N1, a second node N2 and a third scanning signal end SCAN3 respectively, and working way of control circuit 102 is: under control of a third scanning signal received at the third scanning signal end SCAN3, the data signal received by the first node N1 is written into the second node N2 by the control circuit 102; and
- driving sub-circuit 103 is coupled to the second node N2, a driving voltage end Vdd and a light-emitting component 104, and working way of driving sub-circuit 103 is: under the control of a data signal received at the second node N2, driving voltage received at the driving voltage end Vdd is used to drive the light-emitting component 104 work by driving sub-circuit 103.

The circuit of this embodiment can be applied to an OLED liquid crystal display panel, making the light-emitting component 104 in the driving sub-circuit 103 do not emit light by controlling the scanning signals of the first scanning signal end SCAN1 and the third scanning signal end SCAN3 before the liquid crystal display panel switches the screen, thereby improving the smear problem caused by the switching screen of the LCD panel.

Furthermore, since the light-emitting component 104 does not emit light by controlling firstly the scanning signals of the first scanning signal end SCAN1 and the third scanning signal end SCAN3 before switching the screen, the liquid crystal display panel is completely dark. Therefore, when the screen is switched, which solves a problem of smear caused by switching screens. In addition, when the screen is switched, the middle liquid crystal display panel will display black firstly, and then switch other colors, so the contrast ratio of the liquid crystal display panel may be enhanced.

Second Embodiment

Figure 2:
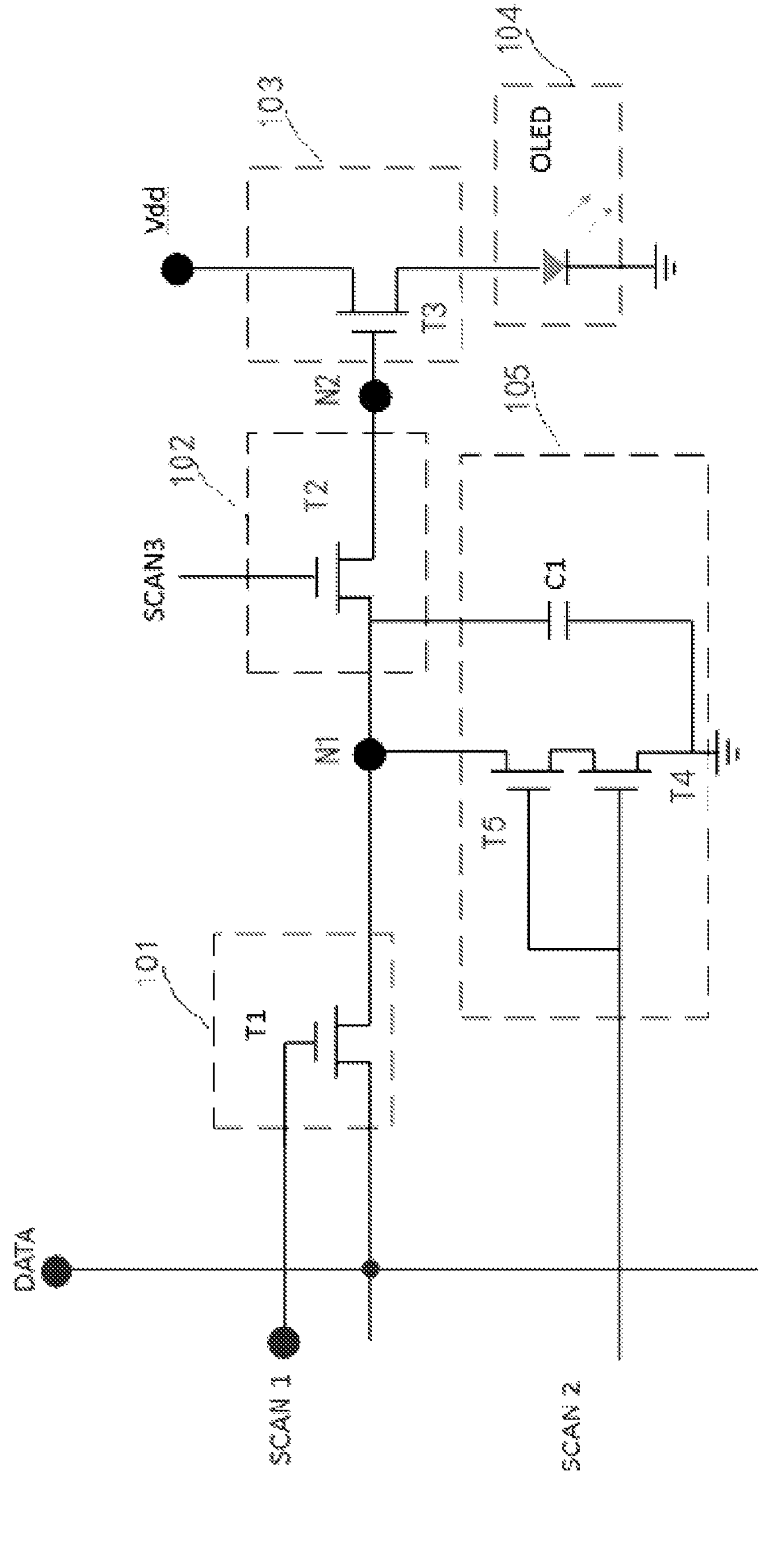
FIG. 2 is a schematic structural diagram of another driving circuit according to an embodiment of the present disclosure.

As shown in FIG. 2, FIG. 2 is a schematic structural diagram of another driving circuit, the driving circuit comprises a data writing circuit 101, a control circuit 102, a driving sub-circuit 103 and a threshold compensation circuit 105.

The data writing circuit 101 comprises: a first active element T1, a gate electrode of the first active element T1 is coupled to the first scanning signal end SCAN1, a source electrode of the first active element T1 is coupled to the data signal end DATA, and a drain electrode of the first active element T1 is coupled to the first node N1.

The control circuit 102 comprises: a second active element T2, a gate electrode of the second active element T2 is coupled to the third scanning signal end SCAN3, a source electrode of the second active element T2 is coupled to the first node N1, and a drain electrode of the second active element T2 is coupled to the second node N2.

The driving sub-circuit 103 comprises: a third active element T3, a gate electrode of the third active element T3 is coupled to the second node N2, a source electrode of the third active element T3 is coupled to the light-emitting component 104, and a drain electrode of the third active element T3 is coupled to the driving voltage end Vdd.

The threshold compensation circuit 105 comprises: a fourth active element T4, a fifth active element T5 and a first capacitor C1, a gate electrode of the fourth active element T4 is coupled to the second scanning signal end SCAN2, and a source electrode of the fourth active element T4 is coupled to the ground end, a drain electrode of the fourth active element T4 is coupled to a source electrode of the fifth active element T5, a gate of the fifth active element T5 is coupled to the second scanning signal end SCAN2, a drain electrode of the fifth active element T5 is coupled to the first node N1; one end of the first capacitor C1 is coupled to a source electrode of the fourth active element T5, and the other end of the first capacitor C1 is coupled to the first node N1.

Under control of the first scanning signal received at the first scanning signal end SCAN1, the first active element T1 is turned on, the second active element T2, the third active element T3, the fourth active element T4 and the fifth active element T5 are turned off, the first capacitor C1 is charged to a first voltage. Under control of the second scanning signal received at the second scanning signal end SCAN2, the fourth active element T4 and the fifth active element T5 are turned on, the first active element T1, the second active element T2 and the third active element T3 are turned off, and the first capacitor C1 is discharged to a second voltage. Under control of the first scanning signal received at the first scanning signal end SCAN1, the first active element T1 is turned on, the second active element T2, the third active element T3, the fourth active element T4 and the fifth active element T5 are turned off, the first capacitor C1 is charged to a third voltage, the third voltage is greater than the first voltage. Under a control of the third scanning signal received at the third scanning signal end SCAN3, the second active element T2 and the third active element T3 are turned on, the first active element T1, the fourth active element T4, and the fifth active element T5 is turned off, the first capacitor C1 is discharged to a fourth voltage, the fourth voltage is greater than the second voltage.

In some embodiments, the first active element T1 comprises a thin film field effect transistor or a metal-oxide semiconductor field effect transistor; the second active element T2 comprises a thin film field effect transistor or a metal-oxide semiconductor field effect transistor; The third active elements T3 comprise a thin film field effect transistor or a metal-oxide semiconductor field effect transistor; the fourth active element T4 comprises a thin film field effect transistor or a metal-oxide semiconductor field effect transistor; the fifth active element T5 comprises a thin films field effect transistor or a metal-oxide semiconductor field effect transistor.

In some embodiments, the light-emitting component 104 may be a light-emitting diode.

In the above circuit structure, when a high-level voltage is outputted by the first scanning signal end SCAN1, a low-level voltage is outputted by the second scanning signal end SCAN2 and the third scanning signal end SCAN3, and the first active element T1 is turned on, the second active element T2, the third active element T3, the fourth active element T4 and the fifth active element T5 are turned off, and the first capacitor C1 is charged to the first voltage;

When a high-level voltage is outputted by the second scanning signal end SCAN2, a low-level voltage is outputted by the first scanning signal end SCAN1 and the third scanning signal end SCAN3, the fourth active element T4 and the fifth active element T5 is turned on, the first active element T1, the second active element T2 and the third active element T3 are turned off, and the first capacitor C1 is discharged to the second voltage;

When a high-level voltage is outputted by the first scanning signal end SCAN1, a low-level voltage is outputted by the second scanning signal end SCAN2 and the third scanning signal end SCAN3, the first active element T1 is turned on, the second active element T2, the third active element T3, the fourth active element T4 and the fifth active element T5 are turned off, and the first capacitor C1 is charged to the third voltage, wherein, the absolute value of the voltage value of the third voltage is equal to the sum of the absolute value of the voltage value of the first voltage and the absolute value of the voltage value of the second voltage.

Through the above steps, the first capacitor C1 may be charged to the third voltage, and the absolute value of the voltage value of the third voltage is equal to the sum of the absolute value of the voltage value of the first voltage and the absolute value of the voltage value of the second voltage, so the threshold voltage of the driving circuit may be compensated, to solve the problem of voltage loss in the drive circuit.

When a high level voltage is outputted by the third scanning signal end SCAN3, a low level voltage is outputted by the first scanning signal end SCAN1 and the second scanning signal end SCAN2, the second active element T2 and the third The active element T3 is turned on, and the light-emitting component 104 emits light.

Before switching the picture and the arriving of a frame of the next picture, the third scanning signal end SCAN3 is controlled to output a low-level voltage, the second active element T2 and the third active element T3 are turned off, no driving voltage drives the light-emitting component 104 to emit light, and the liquid crystal display panel displays darkness, so as to avoid smearing when the liquid crystal display panel switches pictures, thereby improving and solving the problem of smearing.

Figure 3:
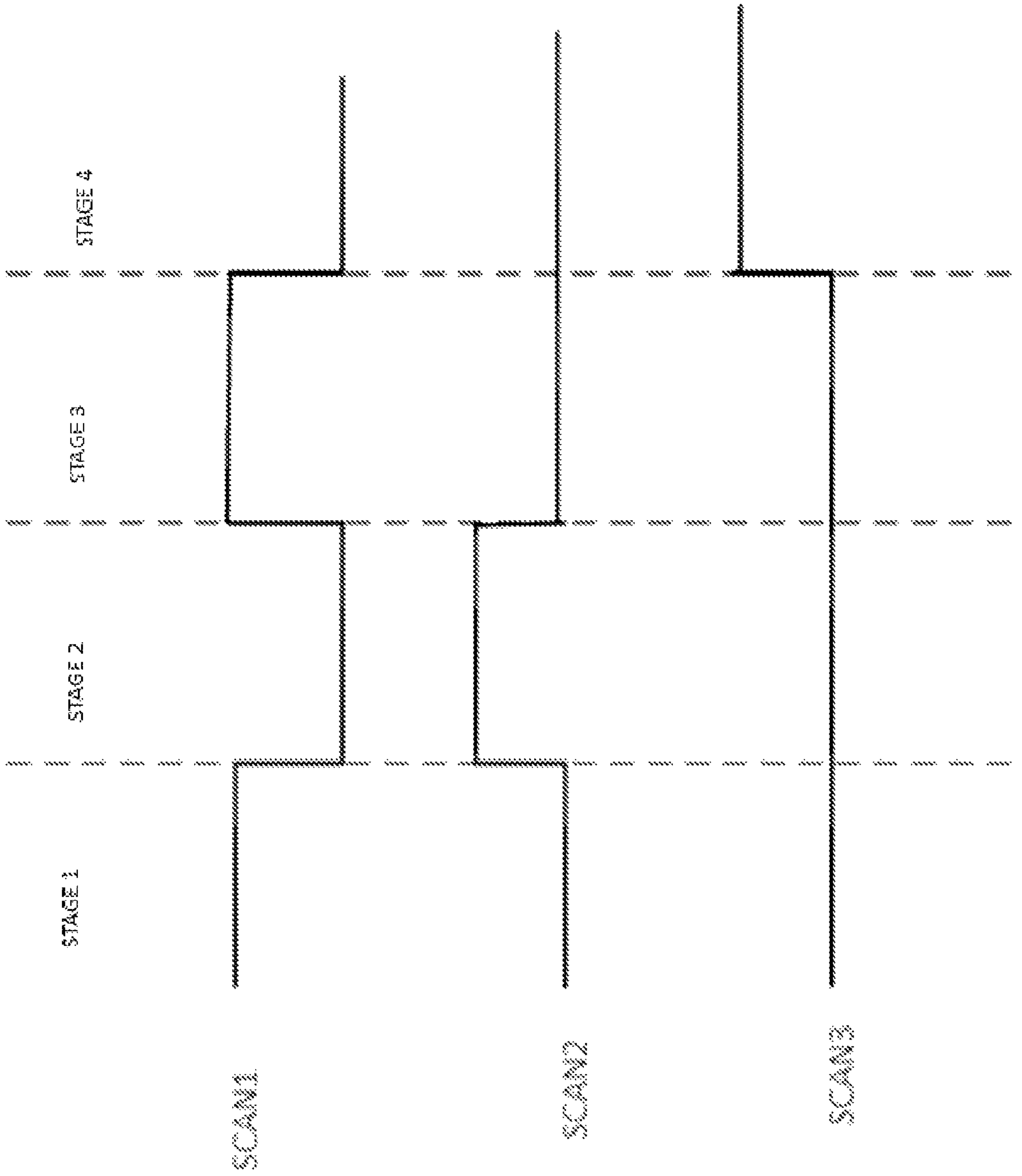
FIG. 3 is a schematic diagram of an output voltage change of a scanning line according to an embodiment of the present disclosure.

In some embodiments, in the above process, the voltage output of the first scanning signal end SCAN1, the second scanning signal end SCAN2 and the third scanning signal end SCAN3 can be seen in FIG. 3:

In stage 1, a high-level voltage is outputted by the first scanning signal end SCAN1, a low-level voltage is outputted by the second scanning signal end SCAN2 and the third scanning signal end SCAN3, and the first capacitor C1 is charged to the first voltage;

In stage 2, a high-level voltage is outputted by the second scanning signal end SCAN2, a low-level voltage is outputted by the first scanning signal end SCAN1 and the third scanning signal end SCAN3, and the first capacitor C1 is discharged to the second voltage;

In stage 3, a high-level voltage is outputted by the first scanning signal end SCAN1, a low-level voltage is outputted by the second scanning signal end SCAN2 and the third scanning signal end SCAN3, and the first capacitor C1 is charged to the third voltage; and In stage 4, a high-level voltage is outputted by the third scanning signal end SCAN3, a low-level voltage is outputted by the first scanning signal end SCAN1 and the second scanning signal end SCAN2, and the driving voltage drives the light-emitting component 104 to emit light.

Figure 4:
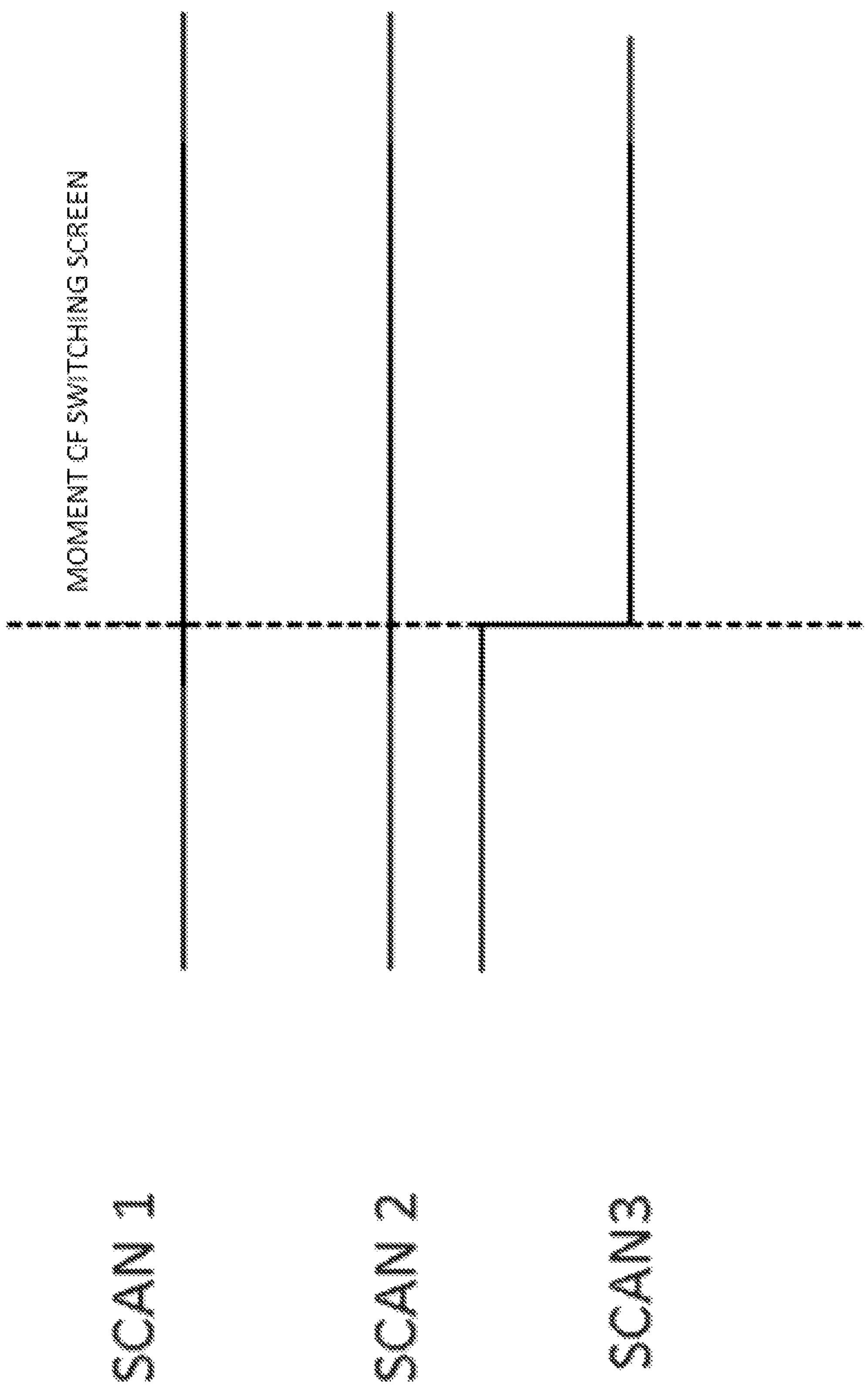
FIG. 4 is a schematic diagram of a voltage change process of a scanning line when a screen is switched according to an embodiment of the present disclosure.

In some embodiments, during the screen switching process, the change situations of voltage output process of the first scanning signal end SCAN1, the second scanning signal end SCAN2 and the third scanning signal end SCAN3 can be seen in FIG. 4. When switching the screen, the output voltage of the first scanning signal end SCAN1 and the second scanning signal end SCAN2 remains unchanged, and still outputs a low-level voltage, and the output voltage of the third scanning signal end SCAN3 changes from a high-level voltage to a low-level voltage, so that the second active element T2 and the third active element T3 is turned off, and the light-emitting diode does not emit light.

Third Embodiment

Figure 5:
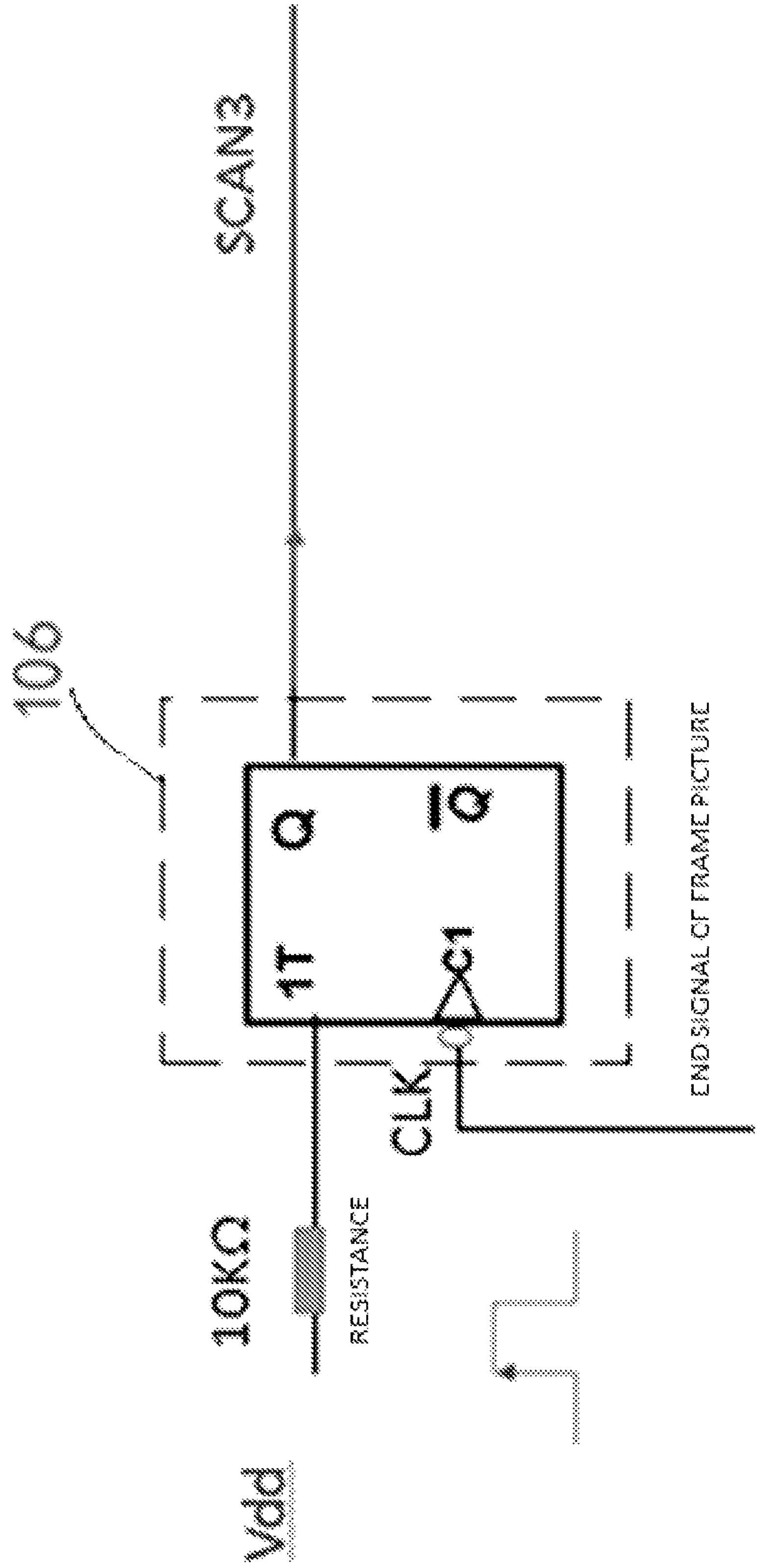
FIG. 5 is a schematic structural diagram of a scanning line control device according to an embodiment of the present disclosure.

Based on the structure of the above driving circuit, referring to FIG. 5, a scanning line control device provided by an embodiment of the present disclosure further comprises a shift register circuit 106, which is coupled to the drive voltage end Vdd, the register signal end CLK, and the third scanning signal end SCAN3 respectively; the working way of the shift register circuit 106 is: under a control of the register signal received at the register signal end CLK, the driving voltage received at the driving voltage end Vdd is output to the third scanning signal end SCAN3 by shift register circuit 106.

The output signal of third scanning signal end SCAN3 may be controlled by the shift register circuit 106 in this embodiment.

In some embodiments, the shift register circuit 106 comprises a first trigger, a first input end of the first trigger is connected with the driving voltage end Vdd through a first resistor, a second input end of the first trigger is connected with the register signal end CLK, and the output end of the first trigger is connected with the third scanning signal end SCAN3.

In some embodiments, the first trigger comprises a T trigger, a D trigger or a JK trigger.

In case of the first trigger being a T trigger, the first input end is a T end of the data input end, the second input end is a CLK end of the clock input end, and the output end is a Q end of the output end.

In some embodiments, the first resistor may be 10 kilo-ohms, and the first resistor may be configured to limit the circuit in the circuit.

Before switching pictures, an end signal of frame picture is inputted to the second input end of the first trigger, the output end of the first trigger changes from outputting a high-level voltage to output a low-level voltage, and the third scanning signal end SCANS outputs a low-level voltage, the second active element T2 and the third active element T3 are turned off, the light-emitting component 104 does not emit light, and the liquid crystal display panel displays darkness. Thereby, the problem of smearing is improved before the screen is switched.

In some embodiments, when switching the screen, the middle liquid crystal display panel will display black first, and then switch other colors, so the contrast ratio of the liquid crystal display panel can be enhanced.

Fourth Embodiment

Figure 6:
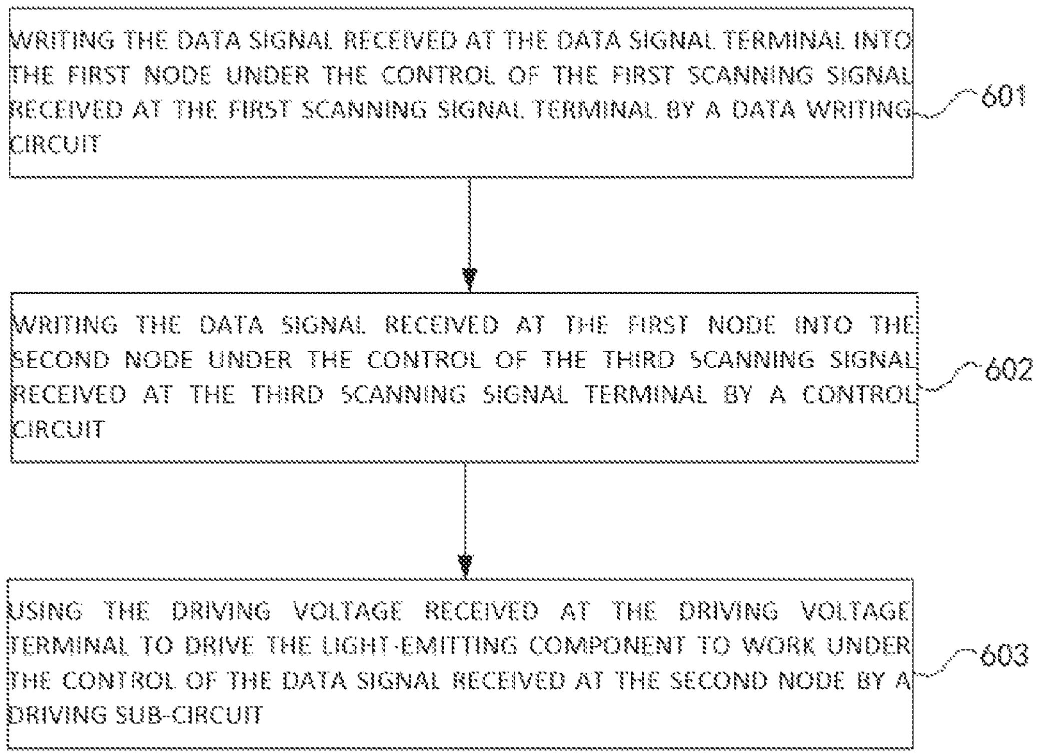
FIG. 6 is a flow chart of a driving method of a driving circuit according to an embodiment of the present disclosure.

A driving method of the driving circuit is provided by an embodiment of the present disclosure based on the above driving circuit, referring to FIG. 6, the method comprises step 601-step 603:

At step 601, writing the data signal received at the data signal end into the first node under the control of the first scanning signal received at the first scanning signal end by a data writing circuit;

At step 602, writing the data signal received at the first node into the second node under the control of the third scanning signal received at the third scanning signal end by a control circuit; and At step 603, using the driving voltage received at the driving voltage end to drive the light-emitting component to work under the control of the data signal received at the second node by a driving sub-circuit.

The above-mentioned method provided in this embodiment belongs to the same concept as the above-mentioned driving circuit embodiment, and the specific implementation process is detailed in the driving circuit embodiment, which will not be repeated here.

Fifth Embodiment

Figure 7:
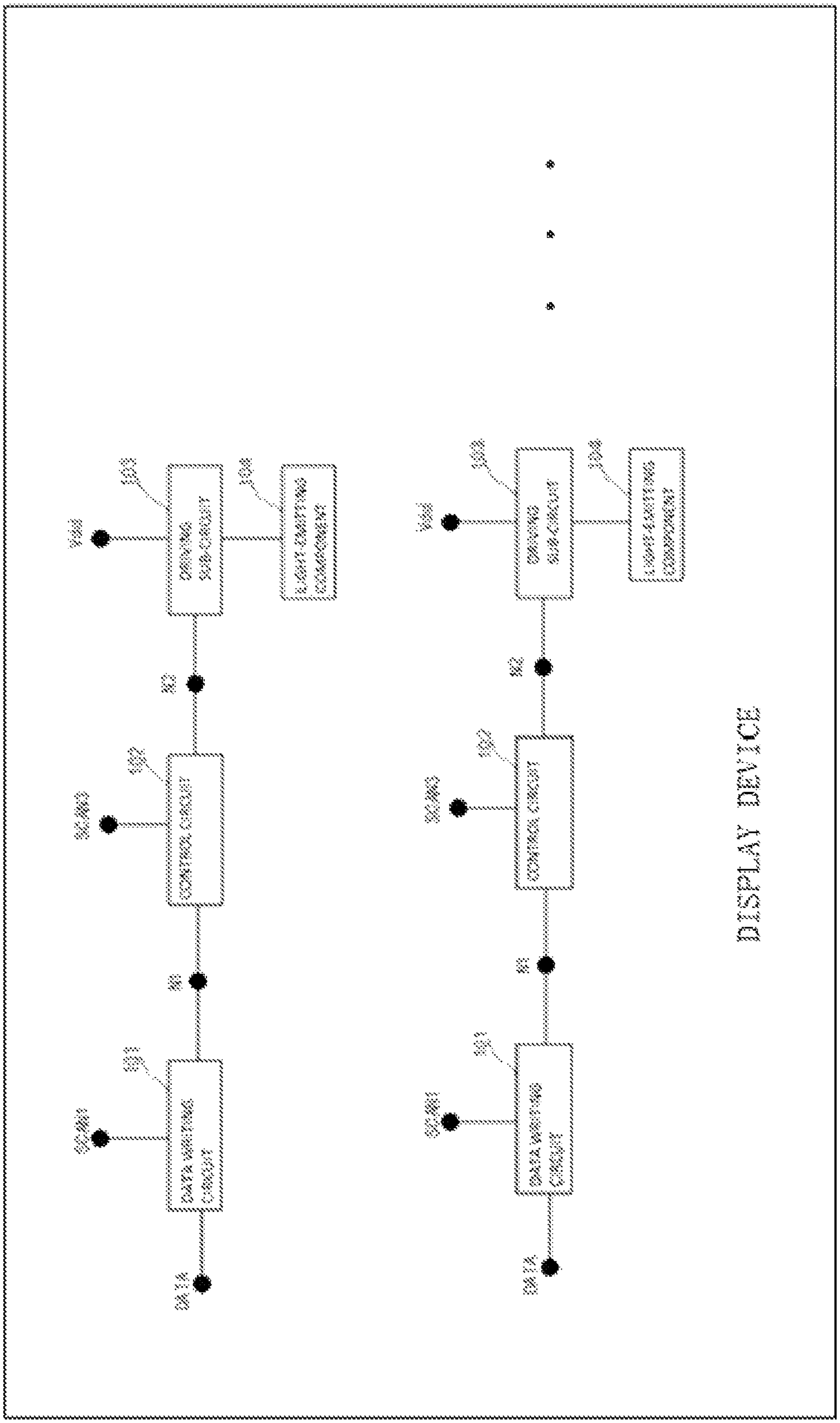
FIG. 7 is a schematic structural diagram of a display device according to an embodiment of the present disclosure.

In some embodiments, referring to FIG. 7, a gate electrode driving circuit 700 is provided by an embodiment of the present disclosure, comprising: a plurality of cascaded driving circuits provided by the embodiment of the present disclosure.

Sixth Embodiment

In some embodiments, referring to FIG. 8, a display device 800 is also provided by an embodiment of the present disclosure, comprising: a plurality of the drive circuits 100 provided by the embodiment of the present disclosure; and a plurality of light-emitting components 104, wherein one driving circuit 100 is coupled to at least one of the light-emitting components 104.

It should also be noted that the terms "comprising", "comprising" or any other variation thereof are intended to encompass a non-exclusive inclusion such that a process, method, article or device comprising a series of elements comprises not only those elements, but also other elements not expressly listed, or which are inherent to such a process, method, article of manufacture, or apparatus are also comprised. Without further limitation, an element qualified by the phrase "comprising a . . . " does not preclude the presence of additional identical elements in the process, method, article of manufacture or apparatus that comprises the element.

The above are merely examples of the present disclosure, and are not intended to limit the present disclosure. Various modifications and variations of this disclosure are possible for those skilled in the art. Any modification, equivalent replacement, improvement, etc. made within the spirit and principle of this disclosure shall be comprised within the scope of the claims of this disclosure.

What is claimed is:

1. A driving circuit, comprising:

a data writing circuit, coupled to a first scanning signal end, a data signal end and a first node, and configured to, under control of a first scanning signal received at the first scanning signal end, write a data signal received at the data signal end into the first node;

a control circuit, coupled to the first node, a second node and a third scanning signal end, and configured to, under control of a third scanning signal received at the third scanning signal end, write a data signal received by the first node into the second node;

a driving sub-circuit, coupled to the second node, a driving voltage end and a light-emitting component, and configured to, under control of a data signal received at the second node, use a driving voltage received at the driving voltage end to drive the light-emitting component; and a shift register circuit, wherein the shift register circuit is coupled to a driving voltage end, a register signal end, and the third scanning signal end; and the shift register circuit is configured to, under control of a register signal received at the register signal end, output, to the third scanning signal end, a driving voltage received at the driving voltage end to which the shift register circuit is coupled;

wherein the shift register circuit further comprises a first trigger, wherein a first input end of the first trigger is connected to a driving voltage end via a first resistance, a second input end of the first trigger is connected to the register signal end, and an output end of the first trigger is connected to the third scanning signal end.

2. The driving circuit of claim 1, wherein the data writing circuit comprises a first active element, wherein a gate electrode of the first active element is coupled to the first scanning signal end, a source electrode of the first active element is coupled to the data signal end, and a drain electrode of the first active element is coupled to the first node.

3. The driving circuit of claim 1, wherein the control circuit comprises a second active element, wherein a gate electrode of the second active element is coupled to the third scanning signal end, a source electrode of the second active element is coupled to the first node, and a drain electrode of the second active element is coupled to the second node.

4. The driving circuit of claim 1, wherein the driving sub-circuit comprises a third active element, a gate electrode of the third active element is coupled to the second node, a source electrode of the third active element is coupled to the light-emitting component, and a drain electrode of the third active element is coupled to the driving voltage end.

5. The driving circuit of claim 1, wherein the first trigger comprises a T-trigger, a D-trigger or a JK-trigger.

6. The driving circuit of claim 5, when the first trigger is the T-trigger, wherein the first input end of the first trigger is a data input end of the T-trigger, the second input end of the first trigger is a clock input end of the T-trigger, the output end of the first trigger is the output end of the T-trigger.

7. The driving circuit of claim 1, wherein the first resistance comprises a first resistor and wherein a resistance value of the first resistor is 10 kΩ.

8. The driving circuit of claim 1, the driving circuit further comprising a threshold compensation circuit, wherein the threshold compensation circuit is coupled to the first node, a second scanning signal end and a ground end, and the threshold compensation circuit is configured to, under control of a second scanning signal received at the second scanning signal end, compensate the data signal received at the first node.

9. The driving circuit of claim 8, wherein the threshold compensation circuit comprises a fourth active element, a fifth active element and a first capacitor, wherein a gate electrode of the fourth active element is coupled to the second scanning signal end, a source electrode of the fourth active element is coupled to the ground end, a drain electrode of the fourth active element is coupled to a source electrode of the fifth active element, a gate of the fifth active element is coupled to the second scanning signal end, a drain electrode of the fifth active element is coupled to the first node; and one end of the first capacitor is coupled to the source electrode of the fourth active element, and the other end of the first capacitor is coupled to the first node;

wherein the first capacitor is charged to a first voltage under control of the first scanning signal received at the first scanning signal end; the first capacitor is discharged to a second voltage under control of the second scanning signal received at the second scanning signal end; the first capacitor is charged to a third voltage under control of the first scanning signal received at the first scanning signal end, wherein the third voltage is greater than the first voltage; and the first capacitor is discharged to a fourth voltage under the control of the third scanning signal received at the third scanning signal end, wherein the fourth voltage is greater than the second voltage.

10. The driving circuit of claim 9, wherein the first active element is a field effect transistor; or the second active element is a field effect transistor; or the third active element is a field effect transistor; or the fourth active element is a field effect transistor; or the fifth active element is a field effect transistor.

11. The driving circuit of claim 10, wherein the first active element is a field effect transistor comprising a thin film field effect transistor or a metal-oxide semiconductor field effect transistor; or the second active element is a field effect transistor comprising a thin film field effect transistor or a metal-oxide semiconductor field effect transistor; or the third active element is a field effect transistor comprising a thin film field effect transistor or a metal-oxide semiconductor field effect transistor; or the fourth active element is a field effect transistor comprising a thin film field effect transistor or a metal-oxide semiconductor field effect transistor; or the fifth active element is a field effect transistor comprising a thin film field effect transistor or a metal-oxide semiconductor field effect transistor.

12. The driving circuit of claim 9, wherein the first active element comprises a thin film field effect transistor or a metal-oxide semiconductor field effect transistor; the second active element comprises a thin film field effect transistor or a metal-oxide semiconductor field effect transistor; the third active element comprises a thin film field effect transistor or a metal-oxide semiconductor field effect transistor; the fourth active element comprises a thin film field effect transistor or a metal-oxide semiconductor field effect transistor; and the fifth active element comprises a thin film field effect transistor or a metal-oxide semiconductor field effect transistor.

13. The driving circuit of claim 1, wherein the light-emitting components comprises a light-emitting diode.

14. The driving circuit of claim 1, wherein there are a plurality of driving circuits, and the plurality of the driving circuits are cascaded.

15. A driving method, wherein a driving circuit comprises:

a data writing circuit, coupled to a first scanning signal end, a data signal end and a first node, and configured to, under control of a first scanning signal received at the first scanning signal end, write a data signal received at the data signal end into the first node;

a control circuit, coupled to the first node, a second node and a third scanning signal end, and configured to, under control of a third scanning signal received at the third scanning signal end, write a data signal received by the first node into the second node;

a driving sub-circuit, coupled to the second node, a driving voltage end and a light-emitting component, and configured to, under control of a data signal received at the second node, use a driving voltage received at the driving voltage end to drive the light-emitting component; and a shift register circuit, wherein the shift register circuit is coupled to a driving voltage end, a register signal end, and the third scanning signal end; and the shift register circuit is configured to, under control of a register signal received at the register signal end, output, to the third scanning signal end, a driving voltage received at the driving voltage end to which the shift register circuit is coupled;

wherein the shift register circuit further comprises a first trigger, wherein a first input end of the first trigger is connected to a driving voltage end via a first resistance, a second input end of the first trigger is connected to the register signal end, and an output end of the first trigger is connected to the third scanning signal end; and wherein the driving method comprises:

writing the data signal received at the data signal end into the first node under control of the first scanning signal received at the first scanning signal end by the data writing circuit;

writing the data signal received at the first node into the second node under control of the third scanning signal received at the third scanning signal end by the control circuit; and using the driving voltage received at the driving voltage end to drive the light-emitting component under control of the data signal received at the second node by the driving sub-circuit.

16. A display device, comprising:

a plurality of driving circuits; and a plurality of light-emitting components, wherein one of the driving circuits is coupled to at least one of the light-emitting components;

wherein the one of the driving circuits comprises:

a data writing circuit, coupled to a first scanning signal end, a data signal end and a first node, and configured to, under control of a first scanning signal received at the first scanning signal end, write a data signal received at the data signal end into the first node;

a control circuit, coupled to the first node, a second node and a third scanning signal end, and configured to, under control of a third scanning signal received at the third scanning signal end, write a data signal received by the first node into the second node;

a driving sub-circuit, coupled to the second node, a driving voltage end and a light-emitting component, and configured to, under control of a data signal received at the second node, use a driving voltage received at the driving voltage end to drive the light-emitting component; and a shift register circuit, wherein the shift register circuit is coupled to a driving voltage end, a register signal end, and the third scanning signal end; and the shift register circuit is configured to, under control of a register signal received at the register signal end, output, to the third scanning signal end, a driving voltage received at the driving voltage end to which the shift register circuit is coupled; and wherein the shift register circuit further comprises a first trigger, wherein a first input end of the first trigger is connected to a driving voltage end via a first resistance, a second input end of the first trigger is connected to the register signal end, and an output end of the first trigger is connected to the third scanning signal end.

* * * * *